United States Patent [19]

Kanda

[11] Patent Number: 5,798,751
[45] Date of Patent: Aug. 25, 1998

[54] IMAGE PROCESSING APPARATUS

[75] Inventor: Jun Kanda, Tsurugashima, Japan

[73] Assignee: Pioneer Electronic Corporation, Tokyo, Japan

[21] Appl. No.: 573,425

[22] Filed: Dec. 15, 1995

[30] Foreign Application Priority Data

Dec. 20, 1994 [JP] Japan ................... 6-316984

[51] Int. Cl.⁶ ................. G09G 5/00; H04N 7/12
[52] U.S. Cl. .................... 345/138; 348/222; 348/845
[58] Field of Search ................. 345/112, 138; 348/222, 446, 458, 459, 845, 845.1; 382/254, 260, 261, 236, 238, 299, 300

[56] References Cited

U.S. PATENT DOCUMENTS

4,654,876  3/1987  Atkins .................... 382/300
4,745,458  5/1988  Hirano et al. ............ 348/446
5,442,718  8/1995  Kobayshi et al. ......... 382/300

Primary Examiner—Jeffery Brier
Attorney, Agent, or Firm—Perman & Green, LLP

[57] ABSTRACT

This image processing apparatus processes image data obtained by interlace scanning. This apparatus comprises a predictor for predicting pixel data of a next field from the pixel data of one of the first and second fields to produce predictive pixel data, an error detection circuit for issuing an error signal having a level corresponding to the difference between the predictive pixel data and the pixel data of the other field, and a selection section for selectively outputting the pixel data of the other field when the level of the error signal is equal to or lower than a predetermined level and selectively outputting the predictive pixel data when the level of the error signal is higher than the predetermined level. The selected pixel data is transferred as the pixel data of the other field to a coding circuit. This apparatus can execute excellent coding even when the vertical discontinuity occurs in moving areas in a frame image due to the scanning time difference between fields.

15 Claims, 11 Drawing Sheets

FIRST FIELD LINE
Px-1,y-1  Px,y-1  Px+1,y-1

SECOND FIELD LINE
Px,y (Predict x,y)

FIRST FIELD LINE
Px-1,y+1  Px,y+1  Px+1,y+1

- ● PIXEL
- ☐ PIXEL TO BE PREDICTED (PREDICTIVE PIXEL)
- ○ PIXEL FOR 6-DOT PREDICTION
- ⊙ PIXEL FOR 2-DOT PREDICTION AND EDGE DETECTION

IMAGE PROCESSING APPARATUS

BACKGROUND OF THE INVENTION

1. Field of the Invention

The present invention relates to an image processing apparatus and, more particularly, to an image processing apparatus which performs the compression coding process on a two-dimensional image signal formed by interlace scanning.

2. Description of the Related Art

One technique concerning such image processing is the intra-frame coding which is disclosed in Japanese Unexamined Patent Publication No. 4-309086. This scheme basically executes the compression coding frame by frame through the combination of orthogonal conversion (transform), such as discrete cosine transform (DCT), and variable-length coding. More specifically, the compression coding is performed by reallocating each of scan lines for a 2-field image signal formed by interlace scanning, to a scan line position for one frame image. In this compression coding which is executed frame by frame, there is a time difference between the scanning of the first field and the scanning of the second field, so that for a moving image, the images of both fields deviate from each other. Therefore, any frame image including a moving image suffers discontinuity between lines in the longitudinal direction or vertical scanning direction of the pixel area associated with that moving image.

Figure 1:
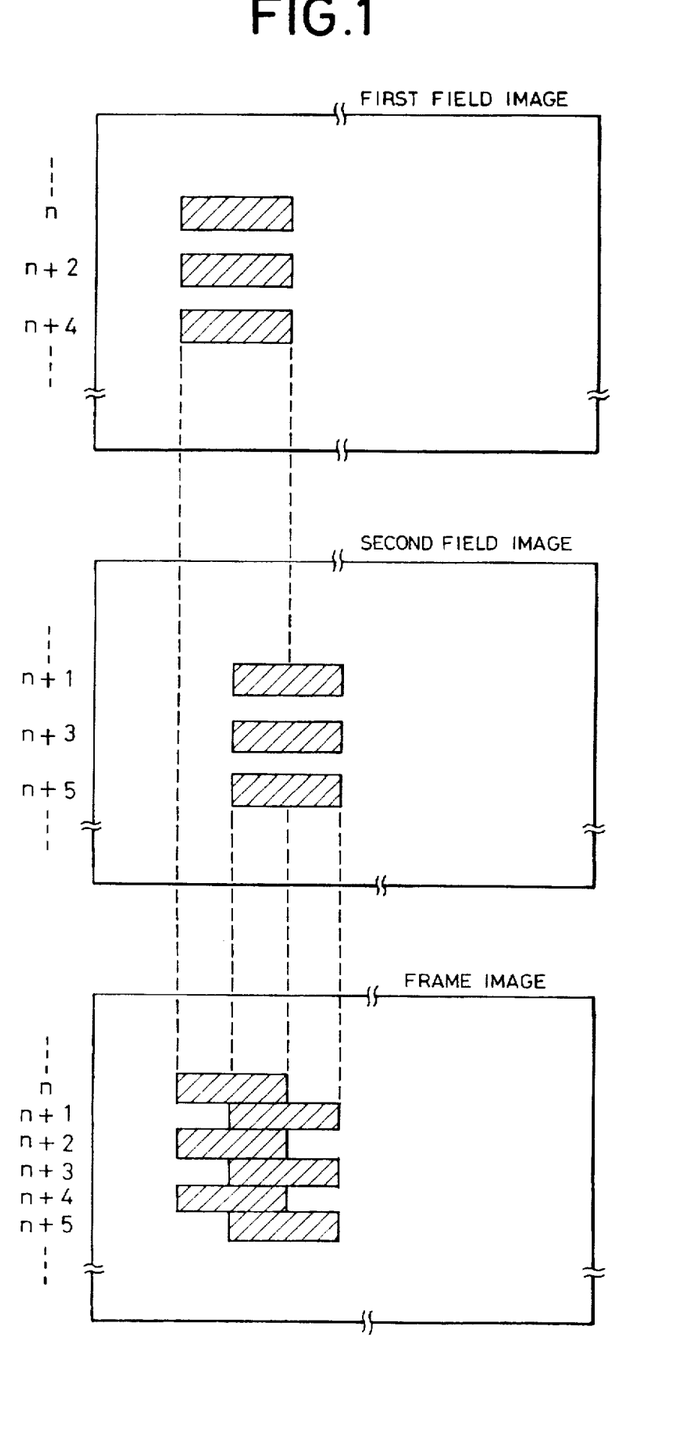
FIG. 1 is a schematic diagram of field and frame images depicting the problem of the discontinuity at the vertical edge of a frame image which is typically caused by a conventional image processing apparatus.

This state is illustrated in FIG. 1. As being apparent from this diagram, the scanning of the first field is performed earlier than the scanning of the second field. If a given image in the periods of the first and second fields is shifted in the horizontal direction, for example, pixel areas corresponding to this image, which are formed at the (n+1)-th, (n+3)-th and (n+5)-th scan line positions in the second field (those pixel areas will be hereinafter called "moving areas") are shifted in the horizontal scanning direction from the moving areas formed at the n-th, (n+2)-th and (n+4)-th scan line positions in the first field. A frame image formed by combining those moving areas has an unaligned edge in the vertical scanning direction.

The image compression coding process with e.g. the combined orthogonal conversion and variable-length coding is designed to reduce the coding rate by using the phenomenon that power is concentrated on a low-frequency component in an orthogonal conversion coefficient. When the vertical discontinuity occurs in moving areas in a frame image due to the aforementioned scanning time difference between fields, a high-frequency component in the vertical direction of moving areas may be intensely produced, thus interfering with the compression coding.

SUMMARY OF THE INVENTION

Accordingly, it is a primary object of the present invention to provide an image processing apparatus capable of well executing a coding process even when the vertical discontinuity occurs in moving areas in a frame image due to the aforementioned scanning time difference between fields.

To achieve the foregoing and other objects and in accordance with the purpose of the present invention, there is provided an image processing apparatus for processing image data including a train of pixel data of a first field of an image and a train of pixel data of a second field, obtained by interlace scanning, which apparatus comprises prediction means for predicting pixel data of a next field on the basis of the pixel data of one of the first and second fields to produce predictive pixel data; error detection means for issuing an error signal having a level corresponding to a difference between the predictive pixel data and the pixel data of the other one of the first and second fields; and selection means for performing selective control in such a way as to selectively output the pixel data of the other field when the level of the error signal is equal to or lower than a predetermined level and selectively output the predictive pixel data when the level of the error signal is higher than the predetermined level.

According to the image processing apparatus of this invention, pixel data of a next field is predicted from the pixel data of one of the first and second fields to produce predictive pixel data, an error signal having a level corresponding to the difference between the predictive pixel data and the pixel data of the other one of the first and second fields is produced, and the pixel data of the other field is selected when the level of the error signal is equal to or lower than a predetermined level, or the predictive pixel data is selected when the level of the error signal is higher than the predetermined level. The selected pixel data is then transferred as the pixel data of the other field to a coding circuit.

DETAILED DESCRIPTION OF THE PREFERRED EMBODIMENTS

The present invention will now be described in detail with reference to the accompanying drawings.

Figure 2:
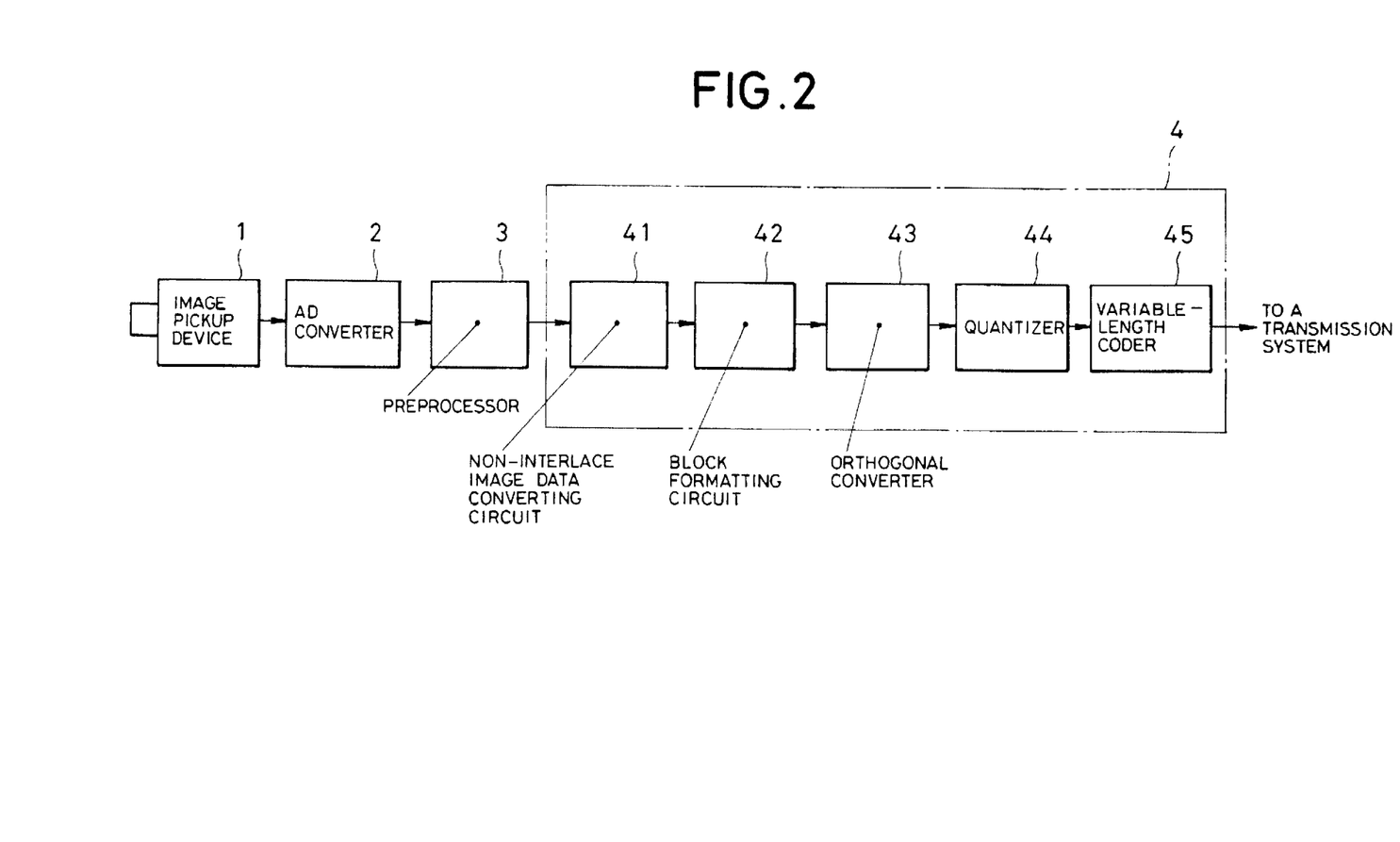
FIG. 2 is a whole block diagram of an image processing apparatus (coding system) according to one embodiment of this invention.

FIG. 2 shows the structure of an image processing apparatus (coding system) according to one embodiment of this invention.

Referring to FIG. 2, an image signal produced by alternately arranging a first field image signal and a second field image signal through interlace scanning in an image pickup device 1 like a TV camera is supplied to an analog-to-digital (AD) converter 2. The AD converter 2 digitalizes the supplied image signal to produce an image data signal, and sends this image data signal to a preprocessor 3. The preprocessor 3, which is the essential feature of this embodiment, performs a special process (to be described later) on the received image data signal to produce image data signal which is to be sent to a compression coder 4.

The image data produced by this preprocessor 3 is a frame image data signal having line positions specified by interlace scanning. This frame image data signal from preprocessor 3 is converted to a frame image data signal having line positions specified by non-interlace scanning in a non-interlace image data converting circuit 41. More specifically, a sequence of line data signals aligned in the scanning order of the image pickup device 1 or field by field is rearranged in the line order according to the positioning in a frame image to produce a non-interlaced image data signal. The image data signal converted by the non-interlace image data converting circuit 41 is sent to a block formatting circuit 42. The block formatting circuit 42 transfers the recieved image data block by block consisting of N×N pixels (N: an integer equal to or greater than 2) to an orthogonal converter 43. The orthogonal converter 43 performs orthogonal conversion like the discrete cosine transform on the received blocks of the frame image and sends the resultant conversion coefficient data signal to a quantizer 44. The quantizer 44 quantizes the received coefficient data signal and sends the quantized data signal to a variable-length coder 45. The variable-length coder 45 performs Huffman coding on the quantized data signal to produce compressed and coded image data signal (compression coded image data signal) and sends the compression coded image data signal to a transmission system.

The transmission system which receives the compression coded image data signal may be any system which executes the so-called cable transmission, the data transmission by means of a recording medium like a magneto-optical disk, air-transmission by radio waves or the like.

Figure 3:
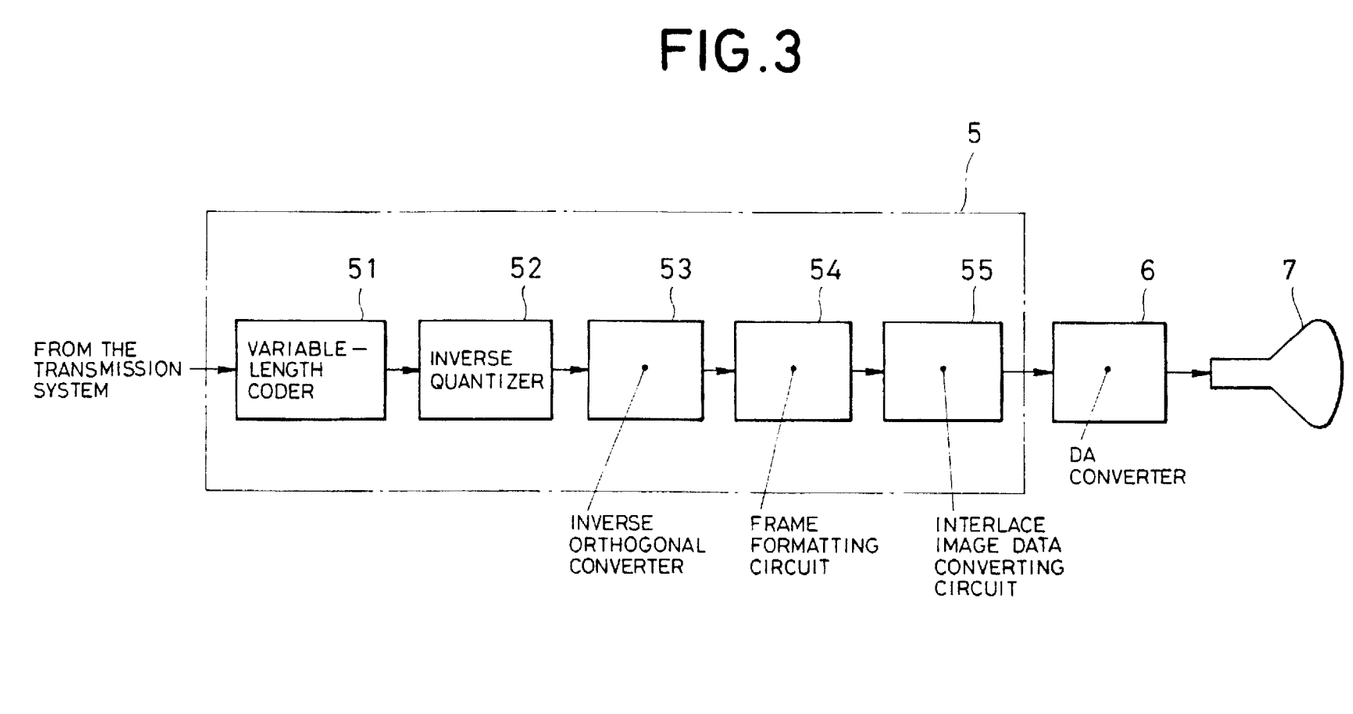
FIG. 3 is a whole block diagram of a decoding system for reproducing compressed and coded image data transferred from the coding system shown in FIG. 2.

FIG. 3 shows the structure of an image processing apparatus (decoding system) which receives a compression coded image data signal produced by the coding system shown in FIG. 2 via the transmission system, and performs decoding and expanding processes on the received image data signals to reproduce images.

In FIG. 3, a decoding/expanding circuit 5 causes a variable-length decoder 51 to perform Huffman decoding on the compression coded image data signals. This decoded image data signals undergoes inverse quantization in an inverse quantizer 52, and the resultant data signals then undergoes inverse orthogonal conversion in an inverse orthogonal converter 53. The resultant data signals from the inverse orthogonal converter 53 is reconstructed to change its block structure to a frame structure in a frame formatting circuit 54. An interlace image data converting circuit 55 converts the reconstructed frame image data signals which has line positions specified by non-interlace scanning, into frame image data signals having line positions specified by interlace scanning. The converted image data signals from the interlace image data converting circuit 55 is converted by a digital-to-analog (DA) converter 6 back to an analog signal. The analog signal is in turn supplied to an image display unit 7, such as a CRT display or a liquid crystal display, to be displayed there as a reproduced image.

The specific structure of the preprocessor 3 will now be described.

Figure 4:
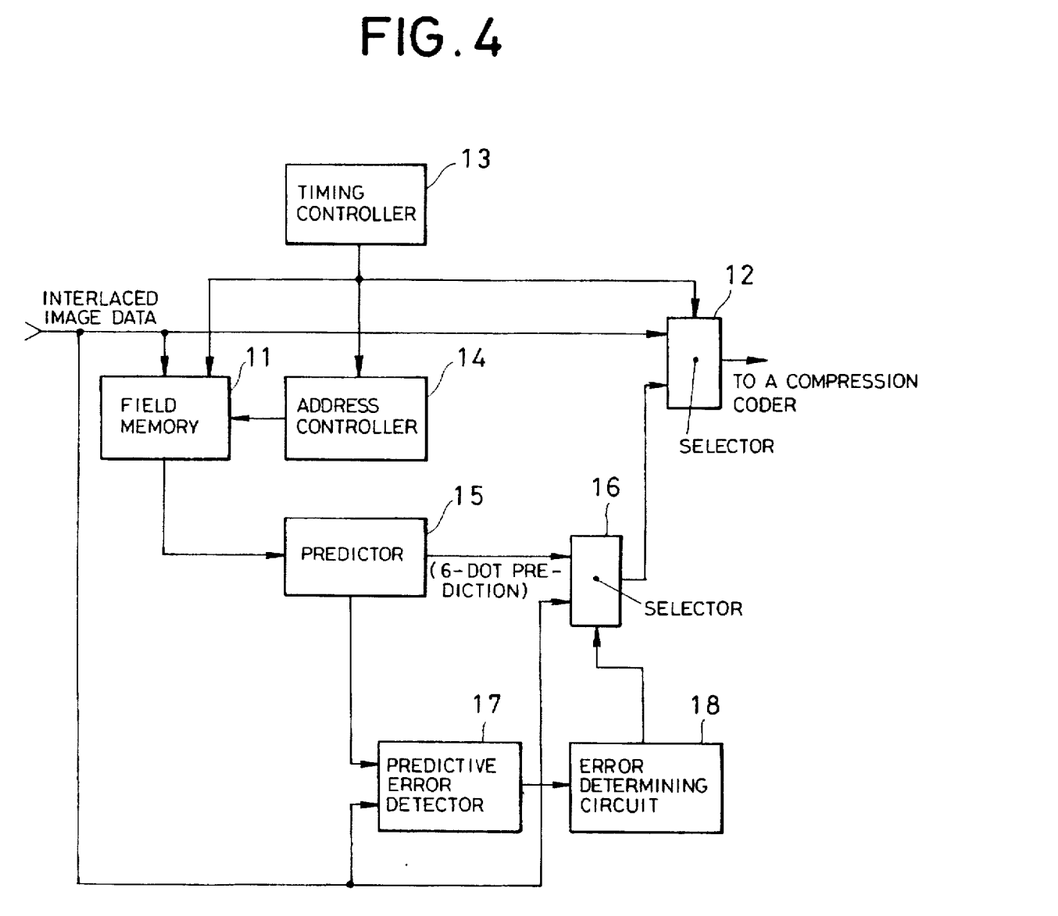
FIG. 4 is a block diagram showing the specific structure of a preprocessor included in the image processing apparatus shown in FIG. 2.

FIG. 4 shows the specific structure of the preprocessor 3. In this case, a image data signal including a train of pixel data of the first field of and a train of pixel data of the second field of an image, obtained by interlace scanning, is supplied to a field memory 11 and a selector 12. The field memory 11 stores the first field (top field) of data from among the supplied image data based on a field identification (ID) signal which is generated by a timing controller 13. A write address in the field memory 11 is supplied by an address controller 14 which sequentially updates the write address in that first field period based on the field ID signal. The selector 12 selectively outputs an image data signal of a first field only in the first field period also based on the field ID signal. Therefore, the image data signal of the first field is all transferred directly to the compression coder. The field ID signal, which is produced by a known field discriminator (not shown) in the timing controller 13, indicates whether the input image data signal is an image data signal of the first half field (i.e., the first field or an odd-numbered field) or an image data signal of the second half field (i.e., the second field or an even-numbered field), both fields constituting one frame.

The first field image data signal stored in the field memory 11 is sequentially transferred to a predictor 15 pixel by pixel. The predictor 15 predicts pixels information of a next field to the first field on the basis of the received first field image data signal, that is, the predictor 15 produces pixel data signals of the second field (bottom field). Hereinafter, the produced pixel data signals are called "predictive pixel data". Then further, the predictor 15 transfers the predictive pixel data to a selector 16 and a predictive error detector 17. This prediction uses particular six dots (for six pixels) of the first field pixel data (pixel data belonging to the first field). The predictive error detector 17 serving as error detection means compares the transferred predictive pixel data with the actual second field pixel data to detect a predictive error (the difference between the pixel information of both pixel data), and sends an error signal having a level corresponding to the detected error to an error determining circuit 18. The error determining circuit 18 compares the supplied error signal with a predetermined level signal, and sends a signal to the selector 16 to selectively output the predictive pixel data from the predictor 15 when the level of the error signal is greater than that of the predetermined level signal, or sends a signal to the selector 16 to selectively output the actual second field pixel data (hereinafter called "actual pixel data") when the level of the error signal is smaller than that of the predetermined level signal. Accordingly, the selector 16 sends either the predictive pixel data or the actual pixel data, pixel by pixel, to the compression coder 4 (see FIG. 2) via the selector 12. The selectors 12 and 16 and the error determining circuit 18 together serve as selection means.

Figure 5:
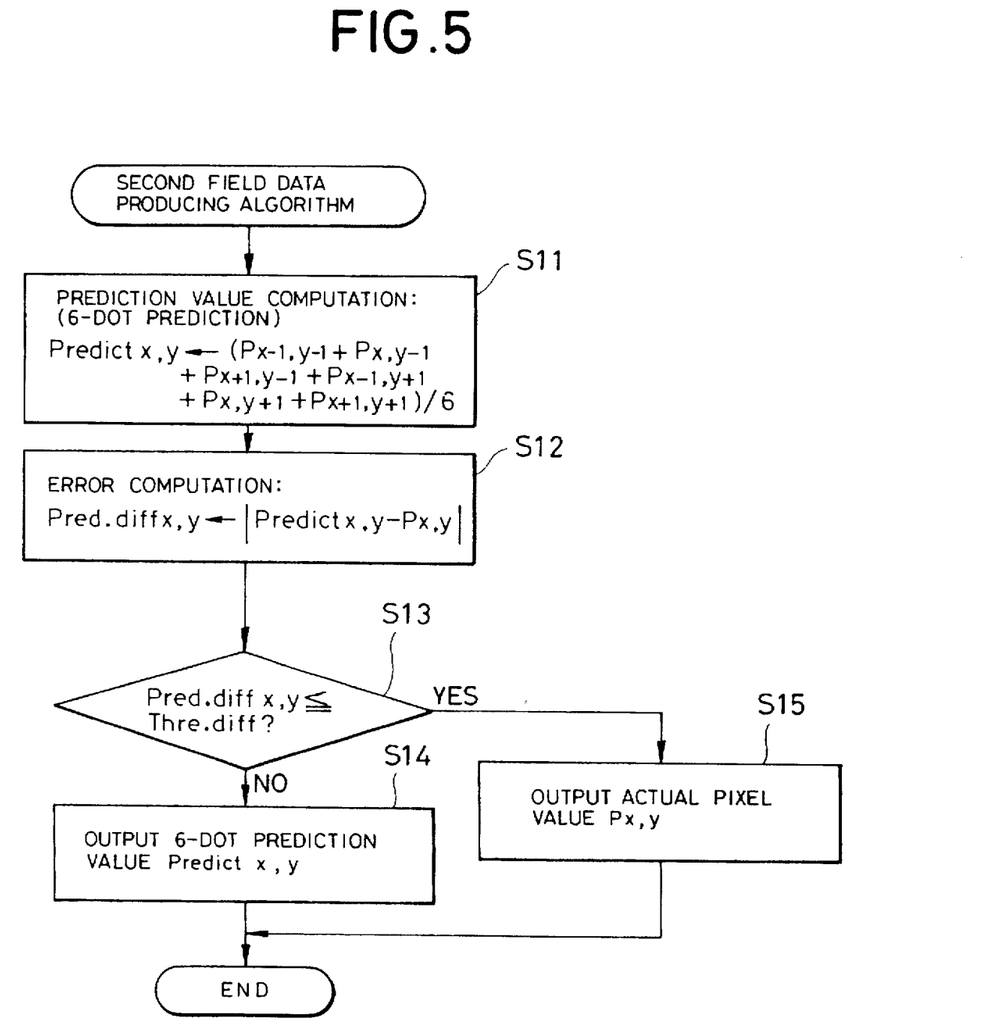
FIG. 5 is a flowchart illustrating an algorithm for producing second field data in the preprocessor shown in FIG. 4.

An algorithm for producing the second field data, which is executed by the predictor 15, the predictive error detector 17, the error determining circuit 18 and the selector 16, can be illustrated as the flowchart in FIG. 5.

Figure 6:
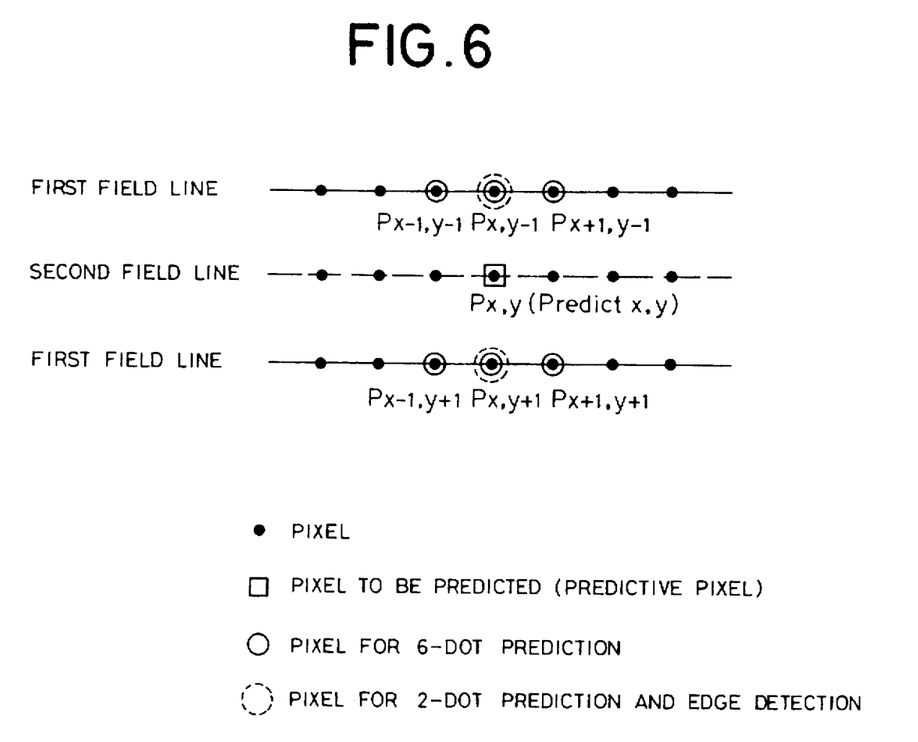
FIG. 6 is an schematic diagram of a frame image for explaining operations for predictive computation and edge detection in this invention.

In FIG. 5, first, the predictor 15 computes the predictive value of the second field pixel data on the basis of the first field data stored in the field memory 11 (step S11). This computation acquires a predictive pixel data $Predict_{x,y}$ corresponding to the position of the actual pixel data $P_{x,y}$ (x indicates the position (dot number in a line) in the horizontal scanning direction and y indicates the position (line number in a frame) in the vertical scanning direction) of the second field from the first field pixel data $P_{x-1,y-1}$, $P_{x,y-1}$, $P_{x+1,y-1}$, $P_{x-1,y+1}$, $P_{x,y+1}$ and $P_{x+1,y+1}$, as shown in FIG. 6. That is, the average value of the first field pixel data for six pixels adjacent to the actual pixel $P_{x,y}$, horizontally, vertically and obliquely is set as the value of the predictive pixel data $Predict_{x,y}$. The equation for this computation is given by:

$$Predict_{x,y}=(P_{x-1,y-1}+P_{x,y-1}+P_{x+1,y-1}+P_{x-1,y+1}+P_{x,y+1}+P_{x+1,y+1})/6 \quad (1)$$

The value of pixel data may be a luminance level, the level of each color signal when an image signal (data) is a so-called RGB signal, the level of a color difference signal, or the like.

The predictive error detector 17 obtains the degree of unmatching or the difference between the predictive pixel data $Predict_{x,y}$, calculated in step S11, and the actual pixel data $P_{x,y}$, i.e., a predictive error $Pred.diff_{x,y}$, from the following equation (step S12).

$$Pred.diff_{x,y}=|Predict_{x,y}-P_{x,y}| \quad (2)$$

The error determining circuit 18 compares the predictive error $Pred.diff_{x,y}$ computed in step S12 with a predetermined threshold value Thre.diff (step S13). When the predictive error is greater than the predetermined threshold value, the error determining circuit 18 controls the selector 16 in such a manner that the predictive pixel data $Predict_{x,y}$ obtained in step S11 (output data of the predictor 15) is transferred via the selector 12 to the compression coder 4 (step S14). When the p redictive error is equal to or smaller than the predetermined threshold value, the selector 16 is controlled so that the direct input data to the preprocessor 3 or the actual pixel data $P_{x,y}$ is transferred via the selector 12 to the compression coder 4 (step S15).

After the actual pixel data $P_{x,y}$ of the second field or the predictive pixel data $Predict_{x,y}$ is produced or transferred to the compression coder 4, the actual pixel data $P_{x+1,y}$ or the predictive pixel data $Predict_{x+1,y}$ for the next pixel is produced or transferred to the compression coder 4. The same processing is performed with respect to all the other pixels of the second fields, pixel by pixel.

The second embodiment of this invention will now be described.

Figure 7:
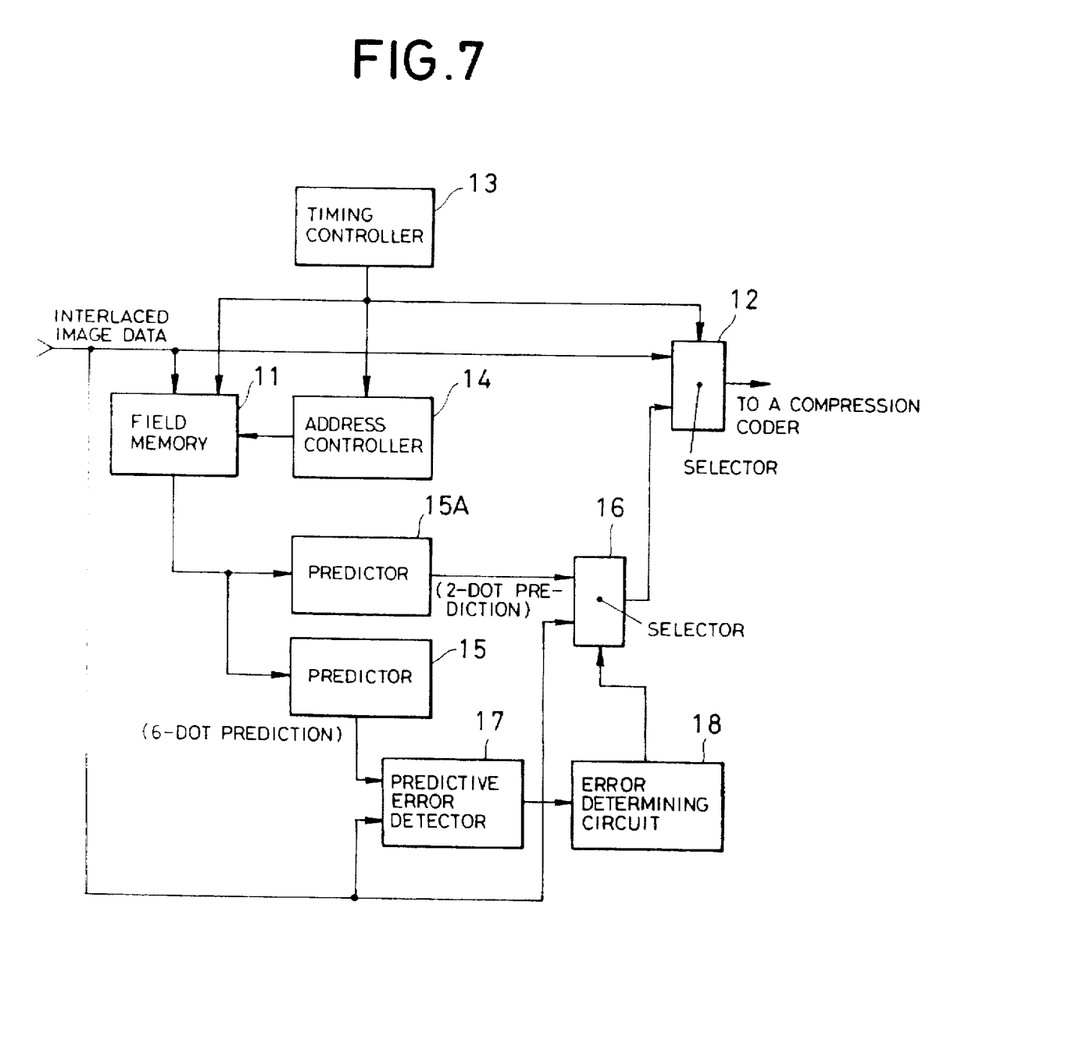
FIG. 7 is a block diagram showing the specific structure of a preprocessor according to a second embodiment of this invention.

FIG. 7 shows a preprocessor with improved prediction means; like or same reference numerals as used in FIG. 4 will be given to the corresponding or identical components.

In FIG. 7, the first field pixel data read from the field memory 11 is sent to a first predictor 15A and a second predictor 15. The first predictor 15A produces predictive pixel data for the second field by using two particular dots (for two pixels) of the first field pixel data and sends it to the selector 16. The second predictor 15 produces predictive pixel data for the second field by using six particular dots (for six pixels) of the first field pixel data and sends it to the predictive error detector 17.

Figure 8:
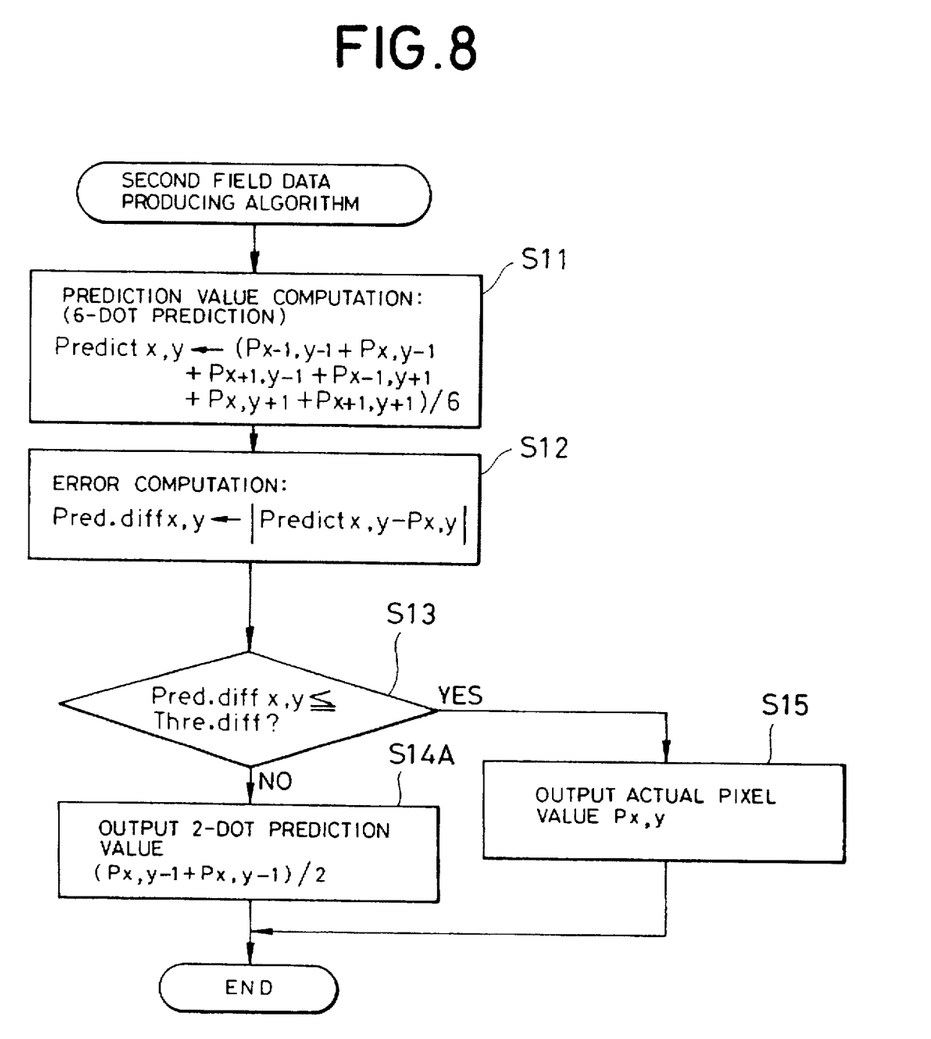
FIG. 8 is a flowchart illustrating an algorithm for producing second field data in the preprocessor shown in FIG. 7.

An algorithm for producing the second field data, which is executed by this preprocessor, can be illustrated as the flowchart in FIG. 8.

Like or same step numbers as used in FIG. 5 will be given to the corresponding or identical steps in FIG. 8. When the predictive error signal is greater than a predetermined threshold value in step S13, the error determining circuit 18 controls the selector 16 in such a manner that the 2-dot predictive pixel data or the output data of the first predictor 15A is transferred via the selector 12 to the compression coder 4 (step S14A).

The feature of the second embodiment lies in that the predictive pixel data which is used to detect a predictive error differs from the predictive pixel data which is to be sent to the compression coder 4. This feature is effective in improving the precision of detecting the motion of an image between fields by the second predictor 15 (or reducing erroneous motion detection) and in preventing the horizontal resolution in the first predictor 15A from being reduced. The second predictor 15 performs prediction computation based on six pixels of the first field surrounding the pixel $P_{x,y}$ of the second field as shown in FIG. 6. Since this computation also uses the pixels $P_{x-1,y-1}$, $P_{x+1,y-1}$, $P_{x-1,y+1}$ and $P_{x+1,y+1}$ present in the oblique directions with respect to the pixel $P_{x,y}$, it is likely that the horizontal component of the predictive pixel data contains erroneous data. To avoid this problem, the first predictor 15A for producing the predictive pixel data to be sent to the compression coder 4 uses only two pixels in the prediction, $P_{x,y-1}$ and $P_{x,y+1}$, located above and below the predictive pixel.

The third embodiment of this invention will now be described.

Figure 9:
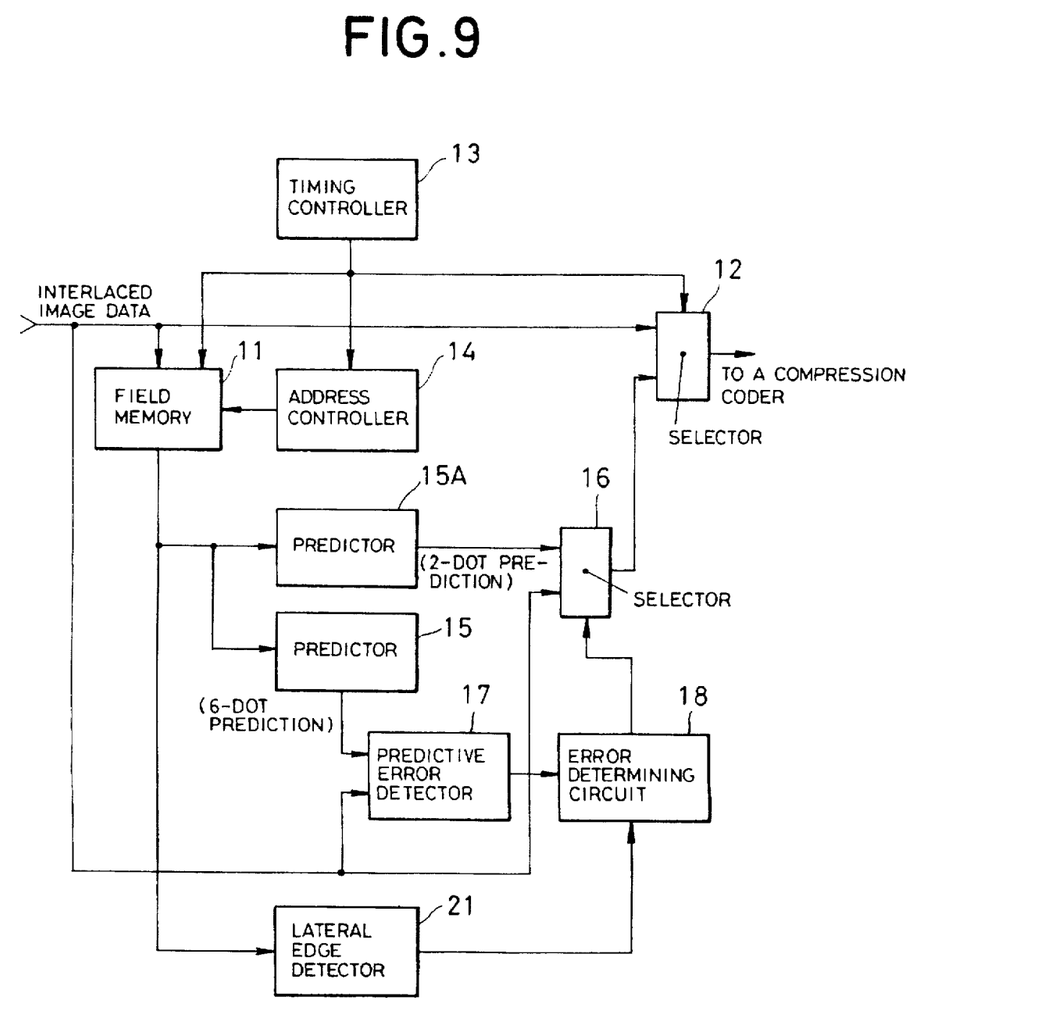
FIG. 9 is a block diagram showing the specific structure of a preprocessor according to a third embodiment of this invention.

FIG. 9 shows a preprocessor which has a lateral edge detector 21 provided in addition to the structure shown in FIG. 7, and uses like or same reference numerals as used in FIG. 7 for the corresponding or identical components.

In FIG. 9, the first field pixel data read from the field memory 11 is sent to a lateral edge detector 21 as well as the first predictor 15A and the second predictor 15. The lateral edge detector 21 detects if the pixel the prediction means will predict is an edge pixel lying along the lateral direction or the horizontal scanning direction in the first field image, based on the first field pixel data. When the lateral edge detector 21 detects the presence of a lateral edge pixel, this detector 21 sends a detection signal to that effect to the error determining circuit 18. In response to this detection signal, the error determining circuit 18 controls the selector 16 so that the actual pixel data is transferred via the selector 12 to the compression coder 4.

Figure 10:
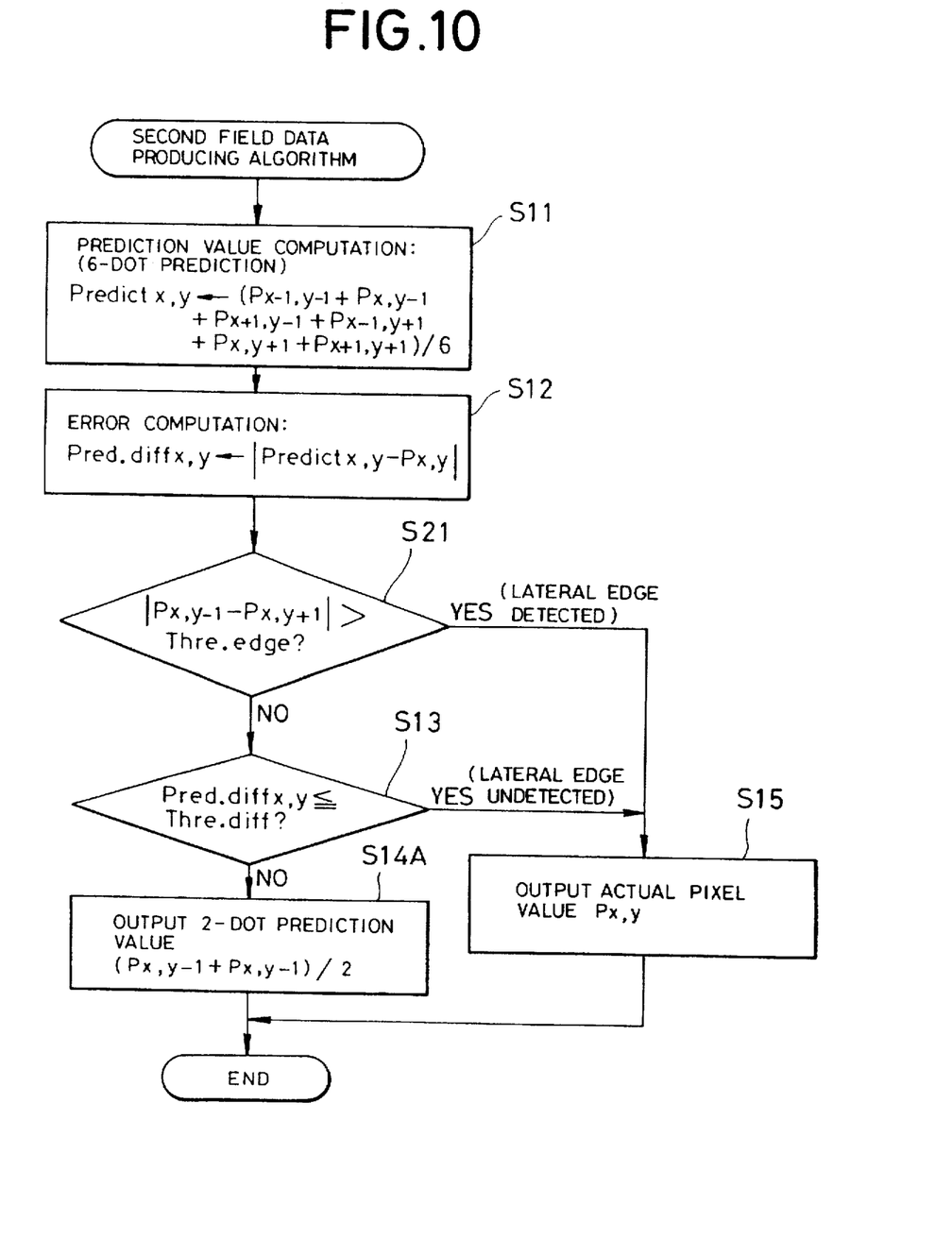
FIG. 10 is a flowchart illustrating an algorithm for producing second field data in the preprocessor shown in FIG. 9.

The details of such edge detection will now be given with reference to the flowchart showing the second field data producing algorithm in FIG. 10.

Like or same step numbers as used in FIG. 8 will be given to the corresponding or identical steps in FIG. 10. In step S21 before step S13, the following equation is used to determine if pixel data to be predicted represents an edge pixel.

$$|P_{x,y-1}-P_{x,y+1}|>Thre.edge \quad (3)$$

More specifically, the difference between the pixels located above and under the predictive pixel $Predict_{x,y}$ is compared with a predetermined threshold value Thre.edge, and when the difference is equal to or below the threshold value, the predictive pixel $Predict_{x,y}$ is determined as no lateral edge, after which the flow proceeds to step S13. When the difference is greater than the threshold value, on the other hand, the predictive pixel $Predict_{x,y}$ is determined as a lateral edge, so that the flow proceeds to step S15 to control the selector 16 so as to send the actual pixel data $P_{x,y}$ to the compression coder 4.

Figure 11:
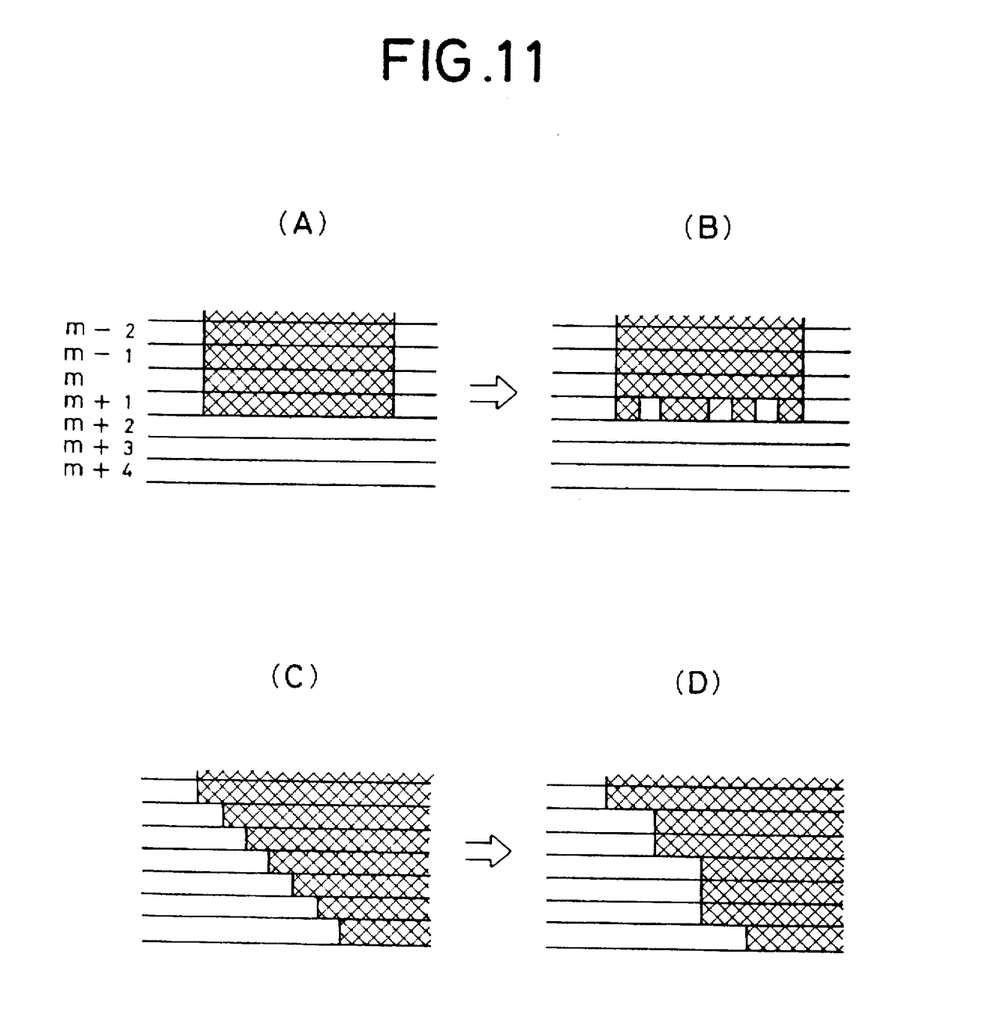
FIG. 11 is an schematic diagram of a frame image for explaining an operation for edge detection in this invention and the advantages of this edge detection.

This edge detection prevents the horizontal edges of edge pixels, which are completely aligned in the horizontal scanning direction as shown in (A) in FIG. 11, from becoming unaligned or zigzag (i.e., some end pixels are not aligned on the horizontal scanning line) as shown in (B) in FIG. 11.

Furthermore, the edge detection prevents the oblique edges of edge pixels, which form an inclined steplike line (for drawing a straight line) as shown in (C) in FIG. 11, from becoming a rough steplike line as shown in (D) in FIG. 11. When image data having white background and a black area expressed by the hatched portion in (A) in FIG. 11 is input to the preprocessor 3, the pixels at the (m+1)-th line belonging to the second field may have a color close to gray and may be blurred edge portion. In this case, the value of the predictive error (Pred.diff$_{x,y}$) comes closer to the predetermined value Thre.diff set in step 13 or in the predictive error detector 17 and becomes unstable around that predetermined value. This may result in erroneous motion detection so that the selection control for the selector 16 may change pixel by pixel even though the target edge forms a horizontal edge. As a result, image data with unaligned or non-uniform edges as shown in (B) and (D) in FIG. 11 may be sent to the compression coder 4. According to the third embodiment, however, step S21 or the lateral edge detector 21 is provided so that when the edge of an image or the presence of an edge pixel is detected, the actual pixel data is supplied to the compression coder 4 regardless of the degree of the predictive error. Therefore, the operational control for the selector 16 becomes consistent in selecting either of two inputs, eliminating the unevenness at the edge shown in (B) and (D) in FIG. 11.

According to the first to third embodiments, when it is determined that there is a motion between the first field and second field, the second field pixel data to be transferred to the compression coder 4 becomes pixel data which has a high relativity to the adjoining pixel data of the first field. Hence, the vertical discontinuity in the moving areas in an interlaced image as explained with reference to FIG. 1 is reduced. This function is advantageous in compression coding executed by the compression coder 4. If the process characterizing this invention is performed prior to the image coding process which is accomplished by the combined orthogonal conversion and variable-length coding as illustrated in FIG. 2, the intense generation of a high-frequency component in the vertical direction of moving areas does not occur, thus preventing the interference with the compression coding. When it is determined that there is no motion between the first field and second field, the actual pixel data is directly transferred to the compression coder 4 so that the resolution is not lowered.

Although the above-described embodiments each use two selectors 12 and 16, they may be so modified as to perform the selective transfer of the predictive pixel data or the actual pixel data and accomplish the same functions as those apparatuses shown in FIGS. 4, 7 and 9, respectively. Although the foregoing description of those embodiments has been given of the case where 2-dot prediction and 6-dot prediction are the prediction method of the prediction means, pixels to be used for the prediction, the number of those pixels and the prediction equation may be changed as needed, or other various prediction methods may also be used. Further, pixels to be used for the lateral edge detection, the number of those pixels and the equation for that detection may be changed as needed, or other various detection methods may also be used. Although the predetermined threshold values Thre.edge and Thre.diff have been treated as fixed values in the first to third embodiments, the threshold values may be variable.

The foregoing description has discussed the transfer of the output data of the preprocessor 3 to the compression coder 4 that uses the combination of orthogonal conversion and variable-length coding, which is one type of orthogonal conversion coding. This invention is not however limited to this particular coding, and the output data of the preprocessor 3 may be subjected to various other types of coding processes such as other orthogonal conversion coding processes and sub-band conversion coding. Although the second field (even-numbered field) of pixel data is predicted based on the first field (odd-numbered field) of pixel data in the individual embodiments, those embodiments may be modified so that the first field pixel data is predicted based on the second field pixel data. That is, this invention covers both types of prediction aspects.

The structure of this invention is not limited to the hardware type, but may be accomplished by software or a combination of both.

According to the image processing apparatus of this invention, as described in detail above, pixel data of a next field is predicted from the pixel data of one of the first and second fields to produce predictive pixel data, an error signal having a level corresponding to the difference between the predictive actual pixel data and the pixel data of the other field is produced, and the pixel data of the other field is selected when the level of the error signal is equal to or lower than a predetermined level, or the predictive pixel data is selected when the level of the error signal is higher than the predetermined level. The selected pixel data is then transferred as the pixel data of the other field to a coding circuit. Accordingly, it is possible to execute excellent coding even when the vertical discontinuity occurs in moving areas in a frame image due to the scanning time difference between fields.

What is claimed is:

1. An image processing apparatus for processing image data including a train of pixel data of a first field of an image and a train of pixel data of a second field, obtained by interlace scanning, said apparatus comprising:

prediction means for predicting pixel data of a next field on the basis of said pixel data of one of said first and second fields to produce predictive pixel data;

error detection means for issuing an error signal having a level corresponding to a difference between said predictive pixel data and said pixel data of the other one of said first and second fields; and selection means for performing selection control in such a way as to selectively output said pixel data of said other field when said level of said error signal is equal to or lower than a predetermined level and selectively output said predictive pixel data when said level of said error signal is higher than said predetermined level.

2. The image processing apparatus according to claim 1, wherein said prediction means produces said predictive pixel data on the basis of at least one particular pixel data of said one of the first and second fields, the particular pixel data corresponding to at least one pixel associated with a pixel to be predicted.

3. The image processing apparatus according to claim 2, wherein said prediction means produces said predictive pixel data on the basis of at least one particular pixel data of said one of the first and second fields, the particular pixel data corresponding to at least one of vertically adjacent pixels being adjacent to a pixel to be predicted in a vertical scanning direction and at least one of obliquely adjacent pixels located in close vicinity of that vertically adjacent pixel in a same horizontal scanning direction.

4. The image processing apparatus according to claim 3, wherein said vertically adjacent pixels are two in number and said obliquely adjacent pixels are four in number.

5. The image processing apparatus according to claim 1, wherein said prediction means has a first predictor for producing first predictive pixel data on the basis of said pixel data of said one of said first and second fields and has a second predictor for producing second predictive pixel data on the basis of said pixel data of the one field, said error detection means issues an error signal having a level corresponding to a difference between said second predictive pixel data and said pixel data of the other field, said selection means selectively outputs said pixel data of said other field when said level of said error signal is equal to or lower than a predetermined level and selectively outputs said first predictive pixel data when said level of said error signal is higher than said predetermined level.

6. The image processing apparatus according to claim 5, wherein said first predictor produces said first predictive pixel data on the basis of at least one particular pixel data of said one of the first and second fields, the particular pixel data corresponding to a predetermined number of pixels associated with a pixel to be predicted, and said second predictor produces said second predictive pixel data on the basis of at least one particular pixel data of the one field, the particular pixel data corresponding to pixels greater in number than said predetermined number and associated with a pixel to be predicted.

7. The image processing apparatus according to claim 6, wherein said first predictor produces said first predictive pixel data on the basis of at least one particular pixel data of said one of the first and second fields, the particular pixel data corresponding to at least one of vertically adjacent pixels being adjacent to a pixel to be predicted in a vertical scanning direction.

8. The image processing apparatus according to claim 7, wherein said second predictor produces said second predictive pixel data on the basis of at least one particular pixel data of said one of the first and second fields, the particular pixel data corresponding to said vertically adjacent pixel and at least one of obliquely adjacent pixels located in close vicinity of said vertically adjacent pixel in a same horizontal scanning direction.

9. The image processing apparatus according to claim 8, wherein said first predictor produces said first predictive pixel data in accordance with an average luminance value of said vertically adjacent pixel, and said second predictor produces said second predictive pixel data in accordance with average luminance values of said vertically adjacent pixel and said obliquely adjacent pixel.

10. The image processing apparatus according to claim 1, further comprising edge detection means for generating an edge detection signal when detecting that said predictive pixel data indicates an edge pixel, and wherein said selection means performs said selection control only when said edge detection signal is not generated and selects said pixel data of said other field when said edge detection signal is generated.

11. The image processing apparatus according to claim 10, wherein said edge detection means obtains a difference between two blocks of pixel data of said one of the first and second fields, the blocks carrying two vertically adjacent pixels being adjacent to a pixel to be predicted in a vertical scanning direction, and generates said edge detection signal when said difference is greater than a predetermined value.

12. The image processing apparatus according to claim 1, further comprising a compression coder which receives selective output data from said selection means.

13. The image processing apparatus according to claim 12, wherein said compression coder has non-interlace data converting means for rearranging said selective output data in a line order according to an alignment for a frame image.

14. The image processing apparatus according to claim 13, wherein said compression coder performs compression coding on output data of said non-interlace data converting means.

15. The image processing apparatus according to claim 14, wherein said compression coding includes orthogonal conversion and variable-length coding.

* * * * *